(12) United States Patent
Sterling

(10) Patent No.: US 7,840,674 B1
(45) Date of Patent: Nov. 23, 2010

(54) ROUTING MESSAGES ACROSS A NETWORK IN A MANNER THAT ENSURES THAT NON-IDEMPOTENT REQUESTS ARE PROCESSED

(75) Inventor: Brian W. Sterling, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 1192 days.

(21) Appl. No.: 10/843,272

(22) Filed: May 10, 2004

(51) Int. Cl.
*G06F 15/173* (2006.01)
(52) U.S. Cl. ............ 709/226; 709/223; 709/224; 709/225
(58) Field of Classification Search .......... 709/226
See application file for complete search history.

(56) References Cited

U.S. PATENT DOCUMENTS

| | | | |
|---|---|---|---|
| 4,807,118 A * | 2/1989 | Lin et al. | 709/237 |
| 7,133,891 B1 * | 11/2006 | Uceda-Sosa et al. | 709/203 |
| 2002/0161890 A1 * | 10/2002 | Chen | 709/226 |
| 2004/0117453 A1 * | 6/2004 | Cheng et al. | 709/212 |
| 2004/0205141 A1 * | 10/2004 | Goland | 709/206 |

* cited by examiner

*Primary Examiner*—Joseph E Avellino
*Assistant Examiner*—Abdelnabi O Musa
(74) *Attorney, Agent, or Firm*—Park, Vaughan, Fleming & Dowler

(57) ABSTRACT

A load balancing method classifies requests routed by a client computer to a server computer as either idempotent or non-idempotent requests. Idempotent requests can be submitted multiple times if not processed on the first attempt. Non-idempotent requests are submitted only once. The method designates a last server that provided an indication that it last processed a request and marks that server as the last available server. In one implementation, the method routes non-idempotent requests to the last available server and routes idempotent requests to any server or any of a subset of servers.

19 Claims, 9 Drawing Sheets

ROUTING MESSAGES ACROSS A NETWORK IN A MANNER THAT ENSURES THAT NON-IDEMPOTENT REQUESTS ARE PROCESSED

BACKGROUND

1. Field of the Invention

This invention relates generally to load balancing requests routed across a computer network among redundant network servers, and more particularly to routing requests across a computer network according to the type of the request.

2. Background Art

Servers often become overloaded with requests for data. It is well-known in the art to distribute processing and communications activity across a computer network so that no single server is overwhelmed. This task is accomplished by providing several servers having redundant capabilities and managing the distribution of requests among these servers. If one server becomes unavailable or overburdened, requests are forwarded to another server that is currently available to serve the request. This process is called load balancing. See, for example, Tony Bourke, *Server Load Balancing* (O'Reilly, 2001), p. 3.

Requests that are routed across a network can be classified as idempotent requests and non-idempotent requests. A request is idempotent if multiple executions of the request yield a result that is identical to the result yielded by a single execution of the request. Thus, subsequent reexecutions of the request have no effect. An example of an idempotent request is a request to update a record in a database. As the result of the single execution of this request, existing data will be updated with the new data. During any subsequent reexecution of this request, the result of the execution will be the same as if the request was satisfied once.

A request is non-idempotent if multiple executions of the request yield different results than does a single execution. An example of a non-idempotent request is a request to insert a new record or to submit a purchase order. A subsequent reexecution of such a request results in adding multiple records or submitting multiple purchase orders.

When a request is submitted to a server and the server provides no indication as to whether it successfully processed the request, there are two possible resulting situations. The first possible situation is that the request was successfully processed, but the server failed to respond for some reason. The second situation is that the request was not successfully processed. Without knowing which of these has taken place, resubmitting the request to a different server may cause the request to be processed twice. Since the result of the execution of an idempotent request will be the same as if the request was satisfied once, there are no negative consequences (other than possible waste of communication bandwidth) associated with resubmitting the request to a different server. Resubmitting non-idempotent requests, however, may be harmful because reexecution of the non-idempotent requests may cause unintended effects.

Existing load-balancing schemes do not differentiate between idempotent and non-idempotent requests. This is undesirable because any attempt to resubmit a non-idempotent request may result in undesirable action of processing the request twice.

Accordingly, what is needed is a technique that differentiates between idempotent and non-idempotent requests to avoid processing non-idempotent requests more than once.

SUMMARY OF THE INVENTION

Requests to a server are classified as either of two types: idempotent requests and non-idempotent requests. The last server that indicated to a client that it processed a request is marked as a last available server. Since the last available server processed the request, it is alive and is more likely to process a subsequent request. A subsequent request is received. If the subsequent request is non-idempotent, it is routed to the last available server to increase the probability that the request will be processed. If a subsequent request is an idempotent request, it is routed to any server or any of a subset of servers.

The client is any intermediary, such as a front-end server, adapted to receive requests from users, generate requests to servers based on data provided by the users, and route the requests to servers. The client maintains a list of the potential requests that can be generated along with the type of a request. In one implementation, the type of the request is indicated by the maximum number of times a request can be resubmitted to a server if the request was not previously processed. Idempotent requests can be submitted more than once. Non-idempotent requests should be submitted only once.

In one embodiment, the client executes a load balancing module. The load balancing module receives a request and determines a type of the request. In one embodiment, the load balancing module determines the type of the request by traversing a list of the request types. The load balancing module routes the request according to its type. In one embodiment, the load balancing module routes idempotent requests to any server or any of a subset of servers, regardless whether that server is available to process the request. As a result, idempotent requests are routed a fraction of the time to unavailable servers. Routing of an idempotent request to any server, or any of a subset of servers is used to determine when unavailable servers have become available to process the request. In another embodiment, when it is desirable to determine as soon as possible when unavailable servers have become available to process requests, the load balancing module first routes an idempotent request to an unavailable server. If the server is unable to process the request, the load balancing module routes the idempotent request to any available server, or any of a subset of available servers. To this end, the load-balancing module maintains the status of servers. The status may indicate whether a server is available to process a request. A server that indicated to the client that it processed a last request is designated as "available." A server that did not process a last request is designated as "unavailable."

If the request is non-idempotent, it is routed to the last server that processed a last request (e.g., the last available server) to increase the probability that the request will be processed. In one implementation, the server that last processed the request provides an indication to the client that it processed the request. When a ratio of non-idempotent requests to idempotent requests is high, it is beneficial to balance routing of non-idempotent requests among a plurality of available servers so that the capacity of available servers is utilized. To this end, in an alternative embodiment, the load balancing module routes non-idempotent requests to any available server, or any of a subset of available servers. The load balancing module uses various selection methods, such as round robin, least recently used, and random selection, to route requests to servers.

Once the request from a client for a particular user was submitted to a server, the load balancing module waits for a server response to the request before sending a subsequent request to the server for that particular user. If the server sends a response indicating that it processed the request, the load balancing module updates the identification of the last available server and returns to receiving a subsequent request.

If the server provided a response that it failed and did not process the request or the response timed out, the load balancing module resubmits the request according to its type. The load balancing module also marks that server as unavailable. In one embodiment, idempotent requests are resubmitted to any other server, and non-idempotent requests are not resumbitted at all.

In an alternative implementation, the load balancing module resides separately from the client. In this embodiment, the client maintains a list of potential requests and the type of a request. The load balancing module maintains the identification of the last available server and optionally status of servers in the cluster of servers. This embodiment is beneficial because the client does not have any knowledge about the status of servers in the cluster of servers. When the load balancing module receives a request, it receives an indication from the client as to the type of the request, as shown by the maximum number of times the request can be submitted to a server. The load balancing module then routes the request according to its type. In one embodiment, idempotent requests are routed to any server or any of a subset of servers and non-idempotent requests are routed to the last available server.

The features and advantages described in this summary and the following detailed description are not all-inclusive, and particularly, many additional features and advantages will be apparent to one of ordinary skill in the art in view of the drawings, specification, and claims.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF PREFERRED EMBODIMENTS

1. System Architecture

Figure 1:
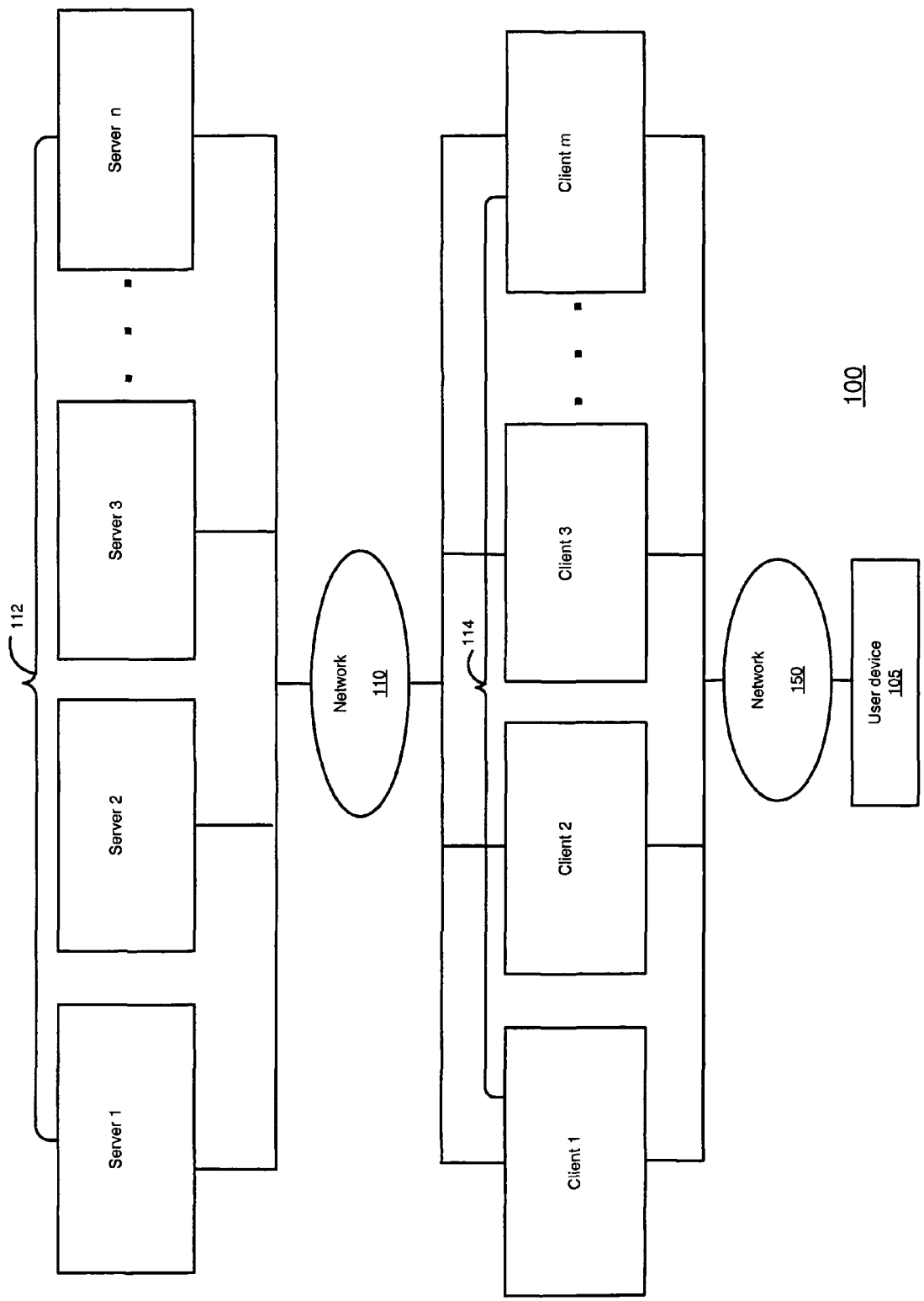
FIG. 1 is a high-level block diagram illustrating a system for implementing an embodiment of the present invention.

FIG. 1 is a high-level block diagram illustrating system 100 including a network 110 (hereafter referred to as the "routing network"), a cluster of servers 112, clients 114, and a network 150. Servers 112 include server 1, server 2, server 3 and server n, where n is a number of servers in a cluster of servers 112. Servers 112 may be situated in a single geographic location, or may be distributed. Servers 112 are also referred to as "back-end" servers. Servers 112 are in communication with a plurality of clients 114, such as client 1, client 2, client m, where m is any suitable number of clients 114, via routing network 110. As used herein, client 114 can be an intermediary, such as a front-end server, adapted to receive requests from users, generate requests to servers 112 based on data provided by the users, and route the requests to servers 112. Routing network 110 can be the Local Area Network (LAN), the Wide Area Network (WAN), the Internet or any other communication system.

Each client 114 is in communication with a user (not shown) via communication network 150. A user accesses client 114 with one or more user devices 105 using, for example, a web browser or other suitable software running on user computers 105. Clients 114 preferably include web-servicing functionality and serve web pages and other data representations to user devices 105. Users access clients 114 with various requests, such as a request to purchase a product or provide information about a particular product. By way of an example only, such a product can be a financial management software application, such as Quicken™ or Quickbooks™ provided by Intuit, Inc. of Mountain View, Calif.

In response to a request received from the user device 105, a client 114 gathers information necessary to process the user request and generates a request to server 112. Continuing with the same example, if the user placed a request to purchase a product, client 114 gathers credit card information, contact information, etc. from the user and generates a request to server 112 to create a user account.

Communication network 150 can be the Internet, and particularly a network supporting the World Wide Web. However, it will also be appreciated that communication network 150 can be any known communication network. User device 105 and client 114 each include hardware and software for establishing and maintaining network connections using standard network protocols such as TCP/IP, HTTP, and SMTP as are known in the art.

Server 112 is a computer system that processes requests. System 100 provides a plurality of servers 112 having redundant capabilities and managing the distribution of requests among servers 112. If one server 112 becomes unavailable, requests are forwarded to another server 112 that is available to serve the request.

Figure 2:
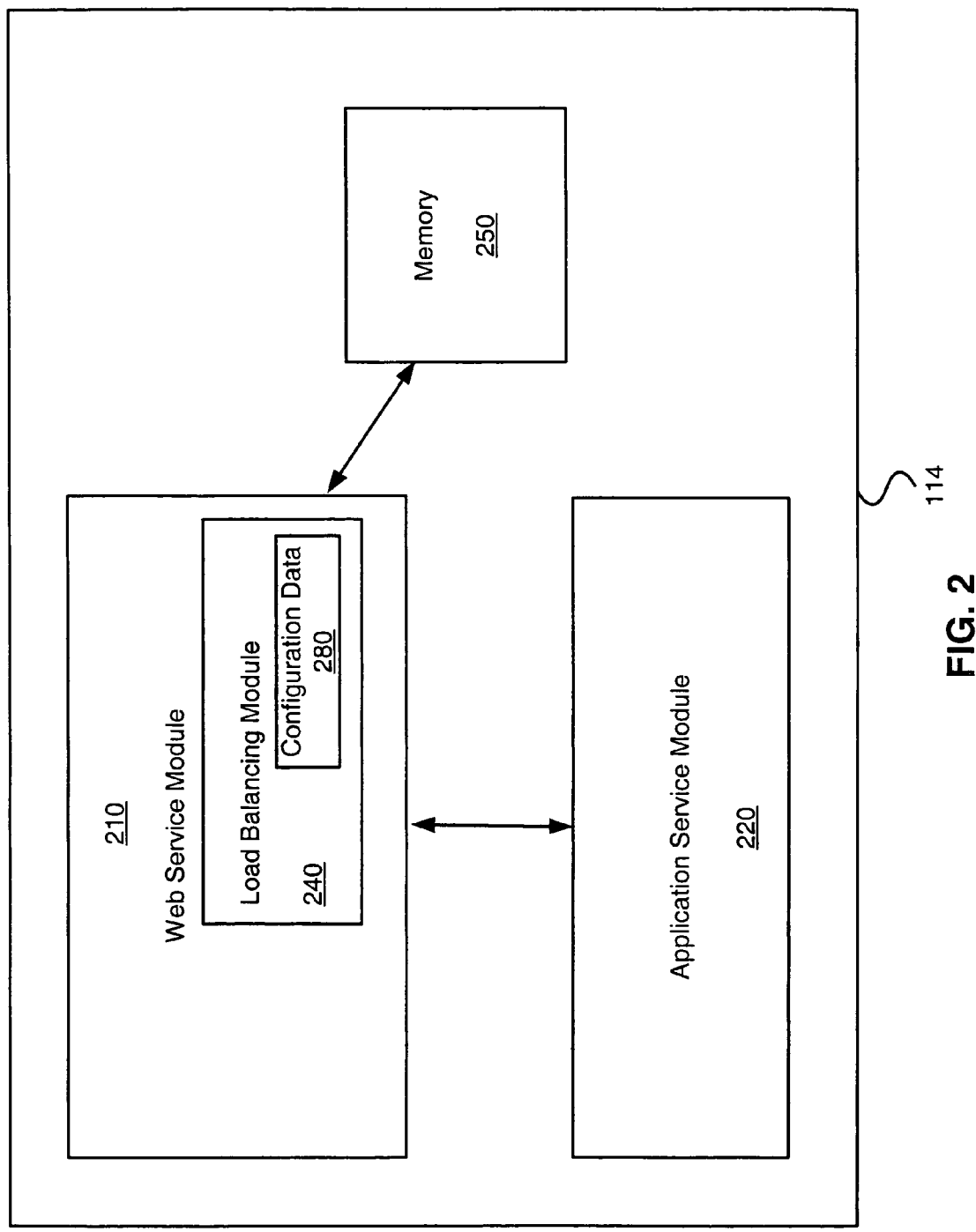
FIG. 2 is a block diagram of a client system for routing requests across a network to servers according to one embodiment of the present invention.

As shown in more detail in FIG. 2, a client 114 executes a web service module 210, an application service module 220, and a load balancing module 240. As used herein, the term "module" refers to computer program code adapted to provide the functionality attributed to the module. Client 114 further includes a memory 250. Referring now to FIG. 2, application service module 220 maintains rules indicating what action needs to be taken in response to a user request. Application service module 220 gathers data required to create a request, such as account information, contact information, credit card information, etc. Application service module 220 determines, for example, when a user account needs to be created or when an order needs to be submitted to servers 112.

The web service module 210 generates requests to servers 112 in response to the data gathered by application service module 220. Exemplary requests include updating a user record in a database, submitting a purchase order, and creating a new user record. Web service module 210 executes load balancing module 240. Load balancing module 240 receives requests generated by web service module 210 and determines the type of a request. If the request is idempotent, load balancing module 240 routes the request to any server or any of a subset of servers. If the request is non-idempotent, load balancing module 240 routes the request to the last available server. Routing requests is described in more detail in the "Methods of Operation" section of this disclosure.

Memory 250 stores a number of data structures. Memory 250 maintains the identification of the last available server. In another implementation, memory 250 maintains a list of servers in a cluster of servers 112 and the status of servers 112.

2. Methods of Operation

Figure 3A:
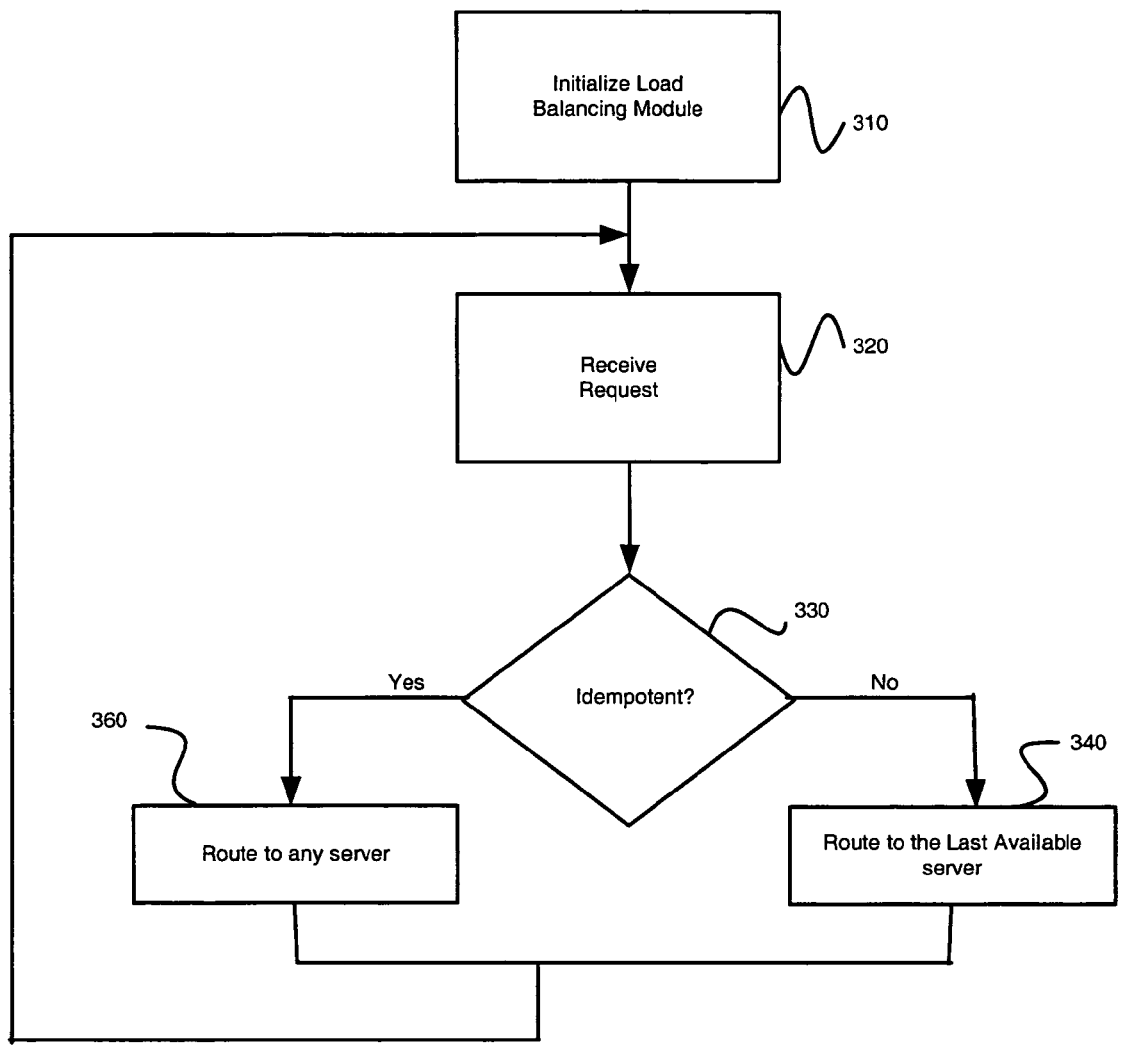
FIG. 3A is flow diagram of a method for routing requests across a network according to an embodiment of the present invention.

FIG. 3A is a flow chart illustrating the steps performed by an embodiment of the present invention. The process commences at step 310 with the initialization of the load balancing module 240. At the initialization, the load balancing module 240 loads configuration data 280. Configuration data 280 includes a list of potential requests that can be generated by a client 114. A request is associated with a type. Requests are classified by either of two types: idempotent and non-idempotent requests. In one implementation, the type of the request is indicated, for example, by the maximum number of times a request can be resubmitted to server 112 if the request was not processed by a server 112. Idempotent requests can be resubmitted multiple times, whereas non-idempotent requests can only be submitted once. The number of times that idempotent requests can be submitted is configurable. In an alternative embodiment, no such limit is imposed on this number. Exemplary types of requests are shown below in Table 1.

TABLE 1

Classification of Requests

| Request | Number of Submissions |
| --- | --- |
| Order.createHeader | 1 |
| Order.createLineItem | 1 |
| Account.create | 3 |
| Account.update | 3 |
| Contact.create | 3 |
| Contact.update | 3 |

Configuration data 280 also includes a list of servers 112: server1; server2; server3; . . . ; server n. The load balancing module 240 also stores the identification of the last server that provided an indication to a client 114 that it processed the request. As used herein, this server is referred to as "the last available server."

After the initialization step, a request is received 320 by load balancing module 240. Module 240 determines the type of the request, such as whether the request is idempotent or non-idempotent. In one embodiment, module 240 determines the type of the request by traversing a list of the request types shown in Table 1. In an alternative implementation, module 240 hashes into the list. As previously discussed, in one implementation, the type of the request is indicated by the maximum number of times the request can be resubmitted to server 114. For example, if the received request is "Contact.create", the load balancing module 240 knows that the request can be sent to server 112 maximum of three times if the request was not processed on a previous attempt. If, in contrast, the request is "Order.createHeader", load balancing module 240 knows that the request should be sent to server 112 only once even if the request was not processed on a previous attempt. It should be noted that idempotent requests can be resubmitted to server 114 any number of times as configurable by load balancing module 240. If the request is idempotent, the request is routed 350 to any server 112 or any of a subset of servers 112 in the cluster of servers 112. If the request is non-idempotent, the request is routed 340 to the last available server. Routing idempotent requests among servers 112 will be described in more detail in reference to FIGS. 4A and 4B. Routing non-idempotent requests will be described in more detail in reference to FIGS. 4C and 4D.

Figure 3B:
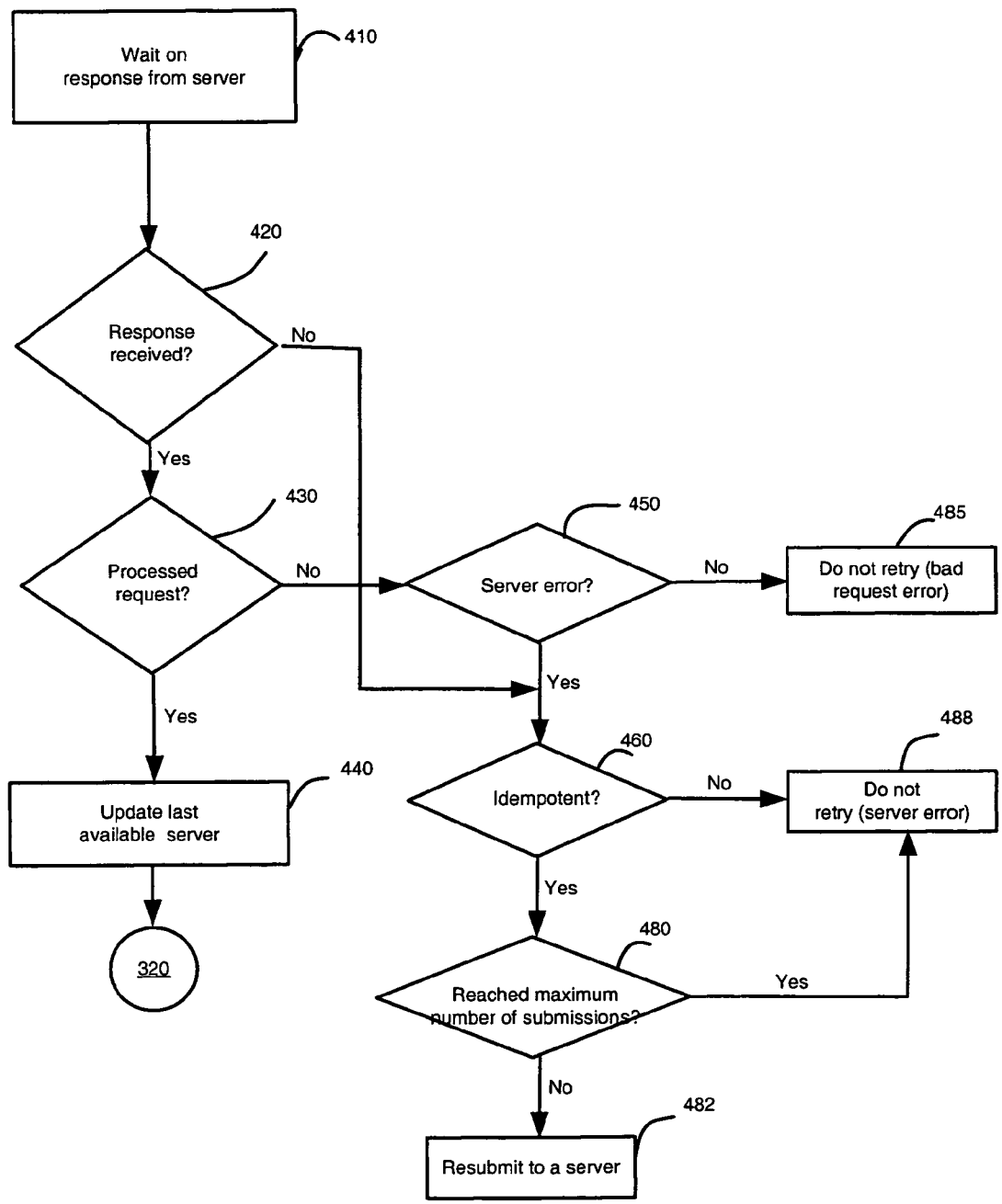
FIG. 3B is a flow diagram of a method for handling responses received from servers.

FIG. 3B is a flow chart illustrating a process of handling responses received from servers 112. In one embodiment, once the request from a client 114 for a particular user was submitted to a server 112, load balancing module 240 waits 410 for a server 112 to respond to the request from that client 114 before module 240 sends a subsequent request to the server 112 for that particular user. The load balancing module 240 then determines 420 whether the response was received from the server 112. If the response that was received from the server 112 indicates that the server processed 430 the request, module 240 updates the ID of the last available server and returns to receiving 320 a subsequent request (as shown in FIG. 3A). If the server 112 did not process the request in 430, there could be two resulting situations. The first possible situation is that the response was received indicating that the server 112 failed (server error 450). In this situation, module 240 determines 460 whether the request is idempotent. If the request is idempotent, module 240 determines 480 whether a maximum number of submissions has been reached. If the maximum number of submissions of an idempotent request has not been reached, module 240 resubmits 482 the idempotent request to a server 112. Otherwise, the idempotent request is not retried 488. If the request is non-idempotent, the request is not retried 488.

A second possible situation that may result if the request was not processed by a server 112 is that the request was malformed and retrying the request to a server 112 is not going to cure the problem. In this situation, the request is not retried 485.

If module 240 does not receive a response from server 112, it may indicate that the response timed out, i.e., the server 112 failed to respond within allotted time. To implement this embodiment, load balancing module 240 maintains a value indicating the period of time after which module 240 should stop waiting for a response from a server 112. If the response timed out, i.e., it has not been received within the specified time period, module 240 determines 460 the type of the request and routes the request according to its type. If the request is idempotent, module 240 determines 480 whether a maximum number of submissions has been reached. If the maximum number of submissions of an idempotent request has not been reached, module 240 resubmits 482 the idempotent request to a server 112. Otherwise, the idempotent request is not retried 488. If the request is non-idempotent, the request is not retried 488.

Routing Idempotent Requests

Figure 4A:
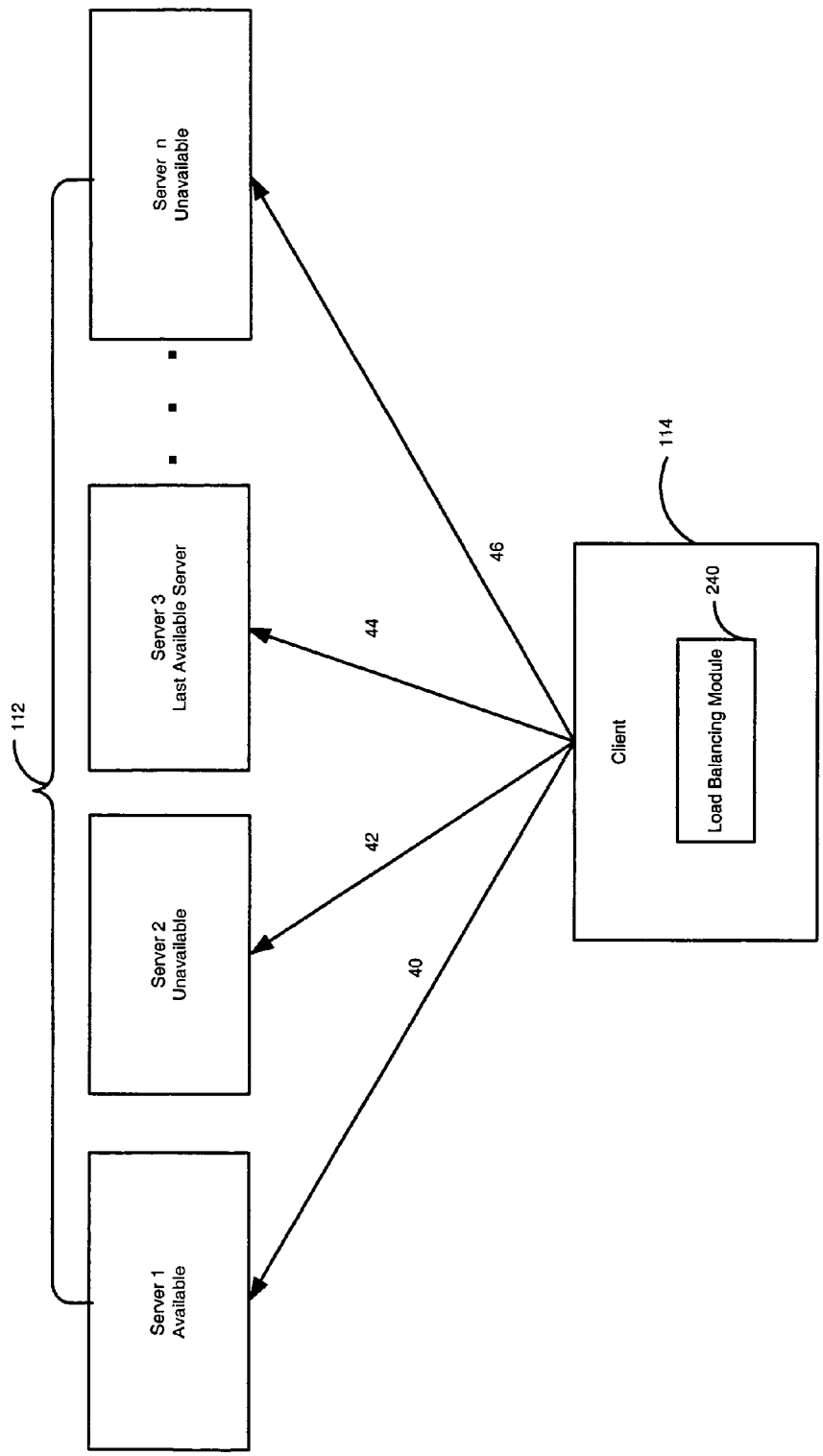
FIG. 4A is a diagram of rotating idempotent requests among servers according to one embodiment of the present invention.

FIG. 4A illustrates rotating of idempotent requests according to one embodiment of the present invention. FIG. 4A shows client 114 and a cluster of servers 112 including server 1, server 2, server 3, and server n. Client 114 executes load balancing module 240. Load balancing module 240 maintains the identification of the last available server, which in this case is server 3. Load balancing module 240 rotates the requests among server 1, server 2, server 3 and server n in the cluster of servers 112 (as shown by arrows 40, 42, 44, and 46 respectively), regardless whether these servers 112 are marked as available. In one implementation, module 240 routes a request to the first server on a list of servers. To assure that the capacity of servers 112 is utilized, load balancing module 240 makes a copy of the list of servers 112 for a request. Module 240 then randomizes the order of the servers 112 on the list of servers. For example, if the full list of servers is: server 1, server 2, server 3, server 4, then the randomized copy of the list is, for example: server 2, server 1, server 4, and server 3.

With reference to FIG. 4A, according to one embodiment, load balancing module 240 selects a first server on the list, which is server 2, and routes 42 the idempotent request to server 2. If server 2 does not provide any indication that it processed the request or communicates to client 114 that it did not process the request, the request is then retried 40 at the next server 112 on the list, which is server 1. If server 1 provides an indication that it processed the request, load balancing module 240 sets the value of the last available server to server 1. The load balancing module 240 returns control to the web service module 210, which in turn returns control to the application service module 220.

It should be noted that load balancing module 240 uses various selection algorithms, such as round robin, least recently used, and any other selection algorithms as is known in the art, to route requests among servers 112.

Thus, in one embodiment, idempotent requests are routed to any server 112 or any of a subset of servers 112 in the cluster of servers 112. As a result, idempotent requests will be routed a fraction of the time to the servers 112 that did not provide an indication that they processed requests. Idempotent requests are used to determine when those servers 112 have become available.

Figure 4B:
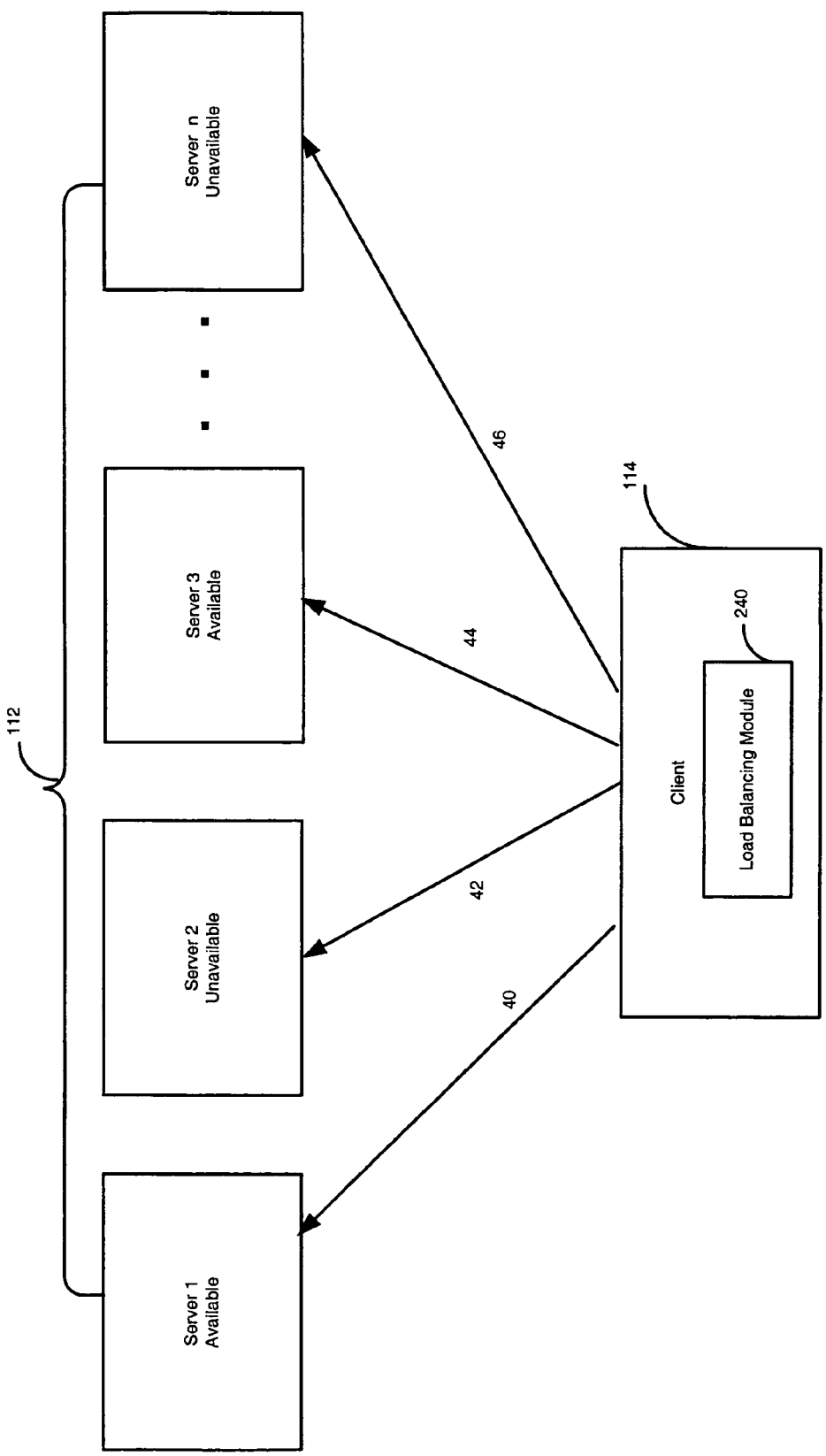
FIG. 4B is a diagram of rotating idempotent requests among servers according to another embodiment of the present invention.

FIG. 4B shows rotating of idempotent requests among servers 112 according to another embodiment of the present invention. In this embodiment, an idempotent request is routed to unavailable server first, for example, server 2. If server 2 did not process the request, module 240 routes the idempotent request to any available server 112, such as server 1 or server 3, or any of a subset of available servers 112. This embodiment is beneficial when it is desirable to determine as soon as possible when unavailable servers 112 are available to process requests. To this end, load balancing module 240 stores a list of servers 112 along with a status of a server in the cluster of servers 112. The status indicates whether the server 112 is available or unavailable, as shown below in Table 2. Thus, in this implementation, when server 112 does not provide an indication that it processed the request or communicates to the client 114 that it did not process the request, load balancing module 240 marks that server 112 as unavailable. If a server 112 provides an indication that it processed the request, the server 112 is marked as "available."

TABLE 2

List of Servers and Their Status

| Server ID | Status |
|---|---|
| Server 1 | Available |
| Server 2 | Unavailable |
| Server 3 | Available |
| ... | ... |
| Server n | Unavailable |

It should be understood that as a request is being processed, status of servers 112 in Table 2 is updated in memory 250. In one implementation, each client 114 keeps its own list of servers 112 and the status of servers in the cluster of servers 112. In yet another implementation, these data is shared among clients 114. In one implementation, module 240 sends the request to the first unavailable server on the list of servers 112. For example, load balancing module 240 selects a first unavailable server on the list, which is server 2, and routes 42 the request to server 2. If server 2 indicates that it processed the request, the load balancing module 240 updates the status of server 2 to indicate that server 2 is available. Module 240 also updates the identification of the last available server. If server 2 does not respond to client 114 or indicates that it could not process the request, the load balancing module 240 routes 40 the request to available server 1 or routes 44 the request to available server 3. As previously described, load balancing module 240 uses various selection algorithms, such as round robin, least recently used, and any other selection algorithms as is known in the art, to route idempotent requests to servers 112.

Routing Non-Idempotent Requests

Figure 4C:
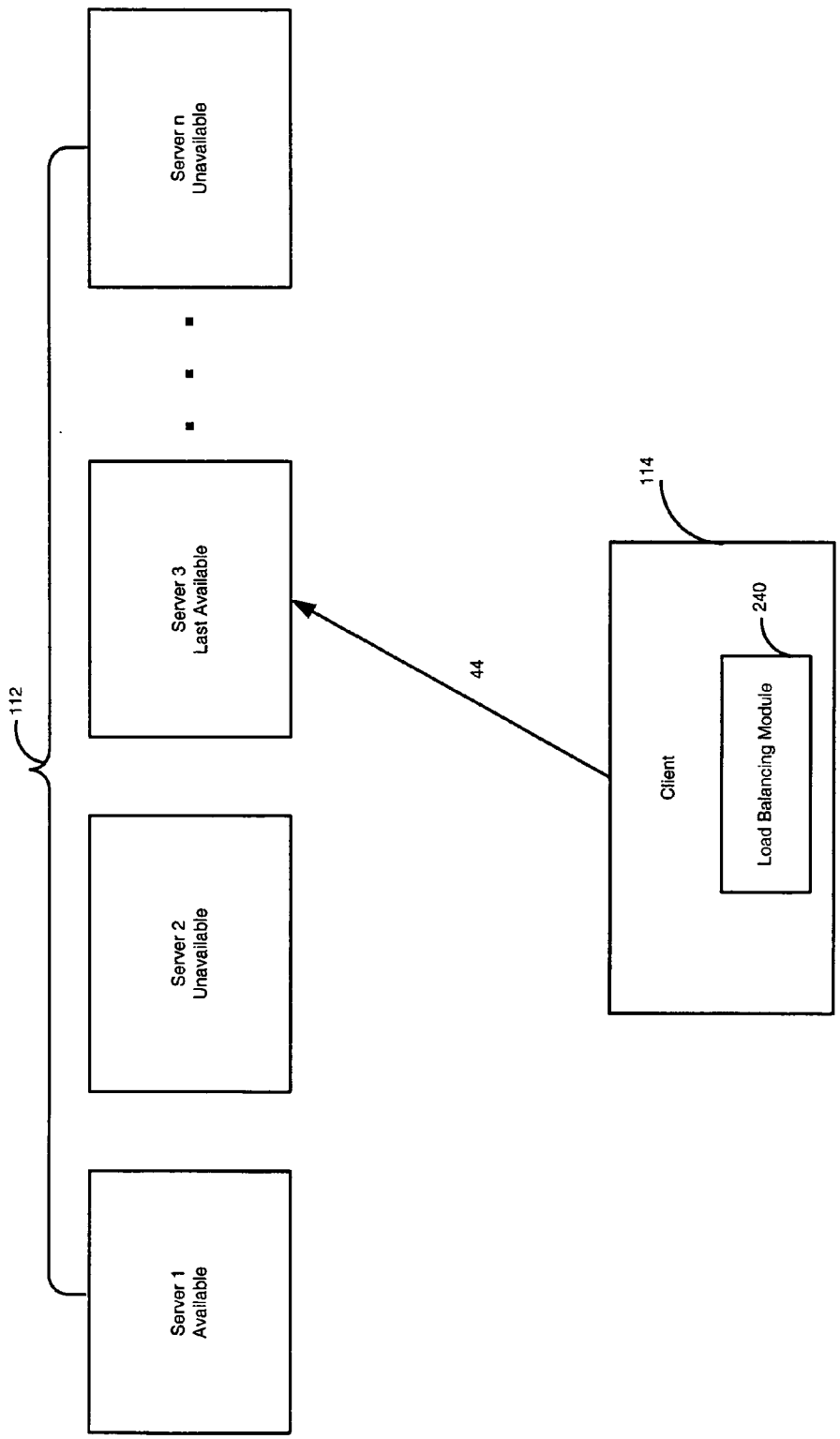
FIG. 4C is a diagram of rotating non-idempotent requests among servers according to one embodiment of the present invention.

FIG. 4C shows routing of non-idempotent requests according to a preferred embodiment of the present invention. As shown in FIG. 4C, load balancing module 240 routes 44 non-idempotent requests to the last available server 112 only. For example, if the last available server is server 3, the request is routed 44 to server 3. If server 3 does not indicate that it processed the request, load balancing module 240 does not resubmit the request. Since the last available server was the last server 112 that indicated to client 114 that it processed a previous request, that server 112 is more likely to process a subsequent request. Thus, routing non-idempotent requests to the last available server reduces the probability that non-idempotent requests will not be processed.

Figure 4D:
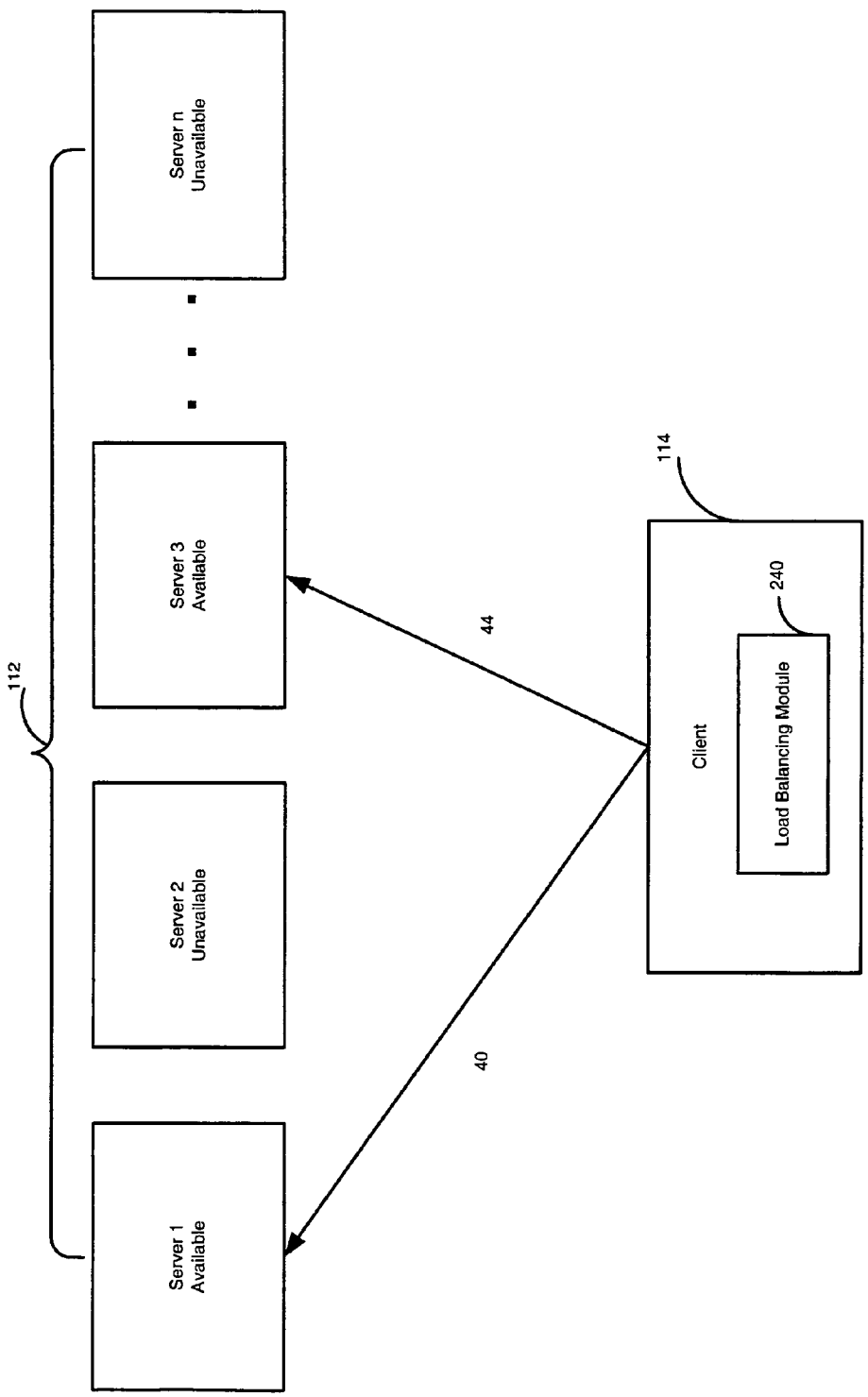
FIG. 4D is a diagram of rotating non-idempotent requests among servers according to another embodiment of the present invention.

When a ratio of non-idempotent requests to idempotent requests is high, it is beneficial to balance non-idempotent requests among a plurality of available servers 112 so that the capacity of available servers is utilized. To this end, load balancing module 240 routes non-idempotent requests to any available server 112, or any of a subset of available servers 112. FIG. 4D shows rotating non-idempotent requests among available server 1 and server 3 in the cluster of servers 112. In one implementation, module 240 sends the request to the first available server on the list of servers 112. For example, load balancing module 240 selects a first available server on the list, which is for example, server 3, and routes 44 the request to server 3. If server 3 does not respond to client 114 or indicates that it did not process the request, the load balancing module 240 stops routing the request. The load balancing module 240 marks server 3 as unavailable.

Alternative Embodiment

Figure 5:
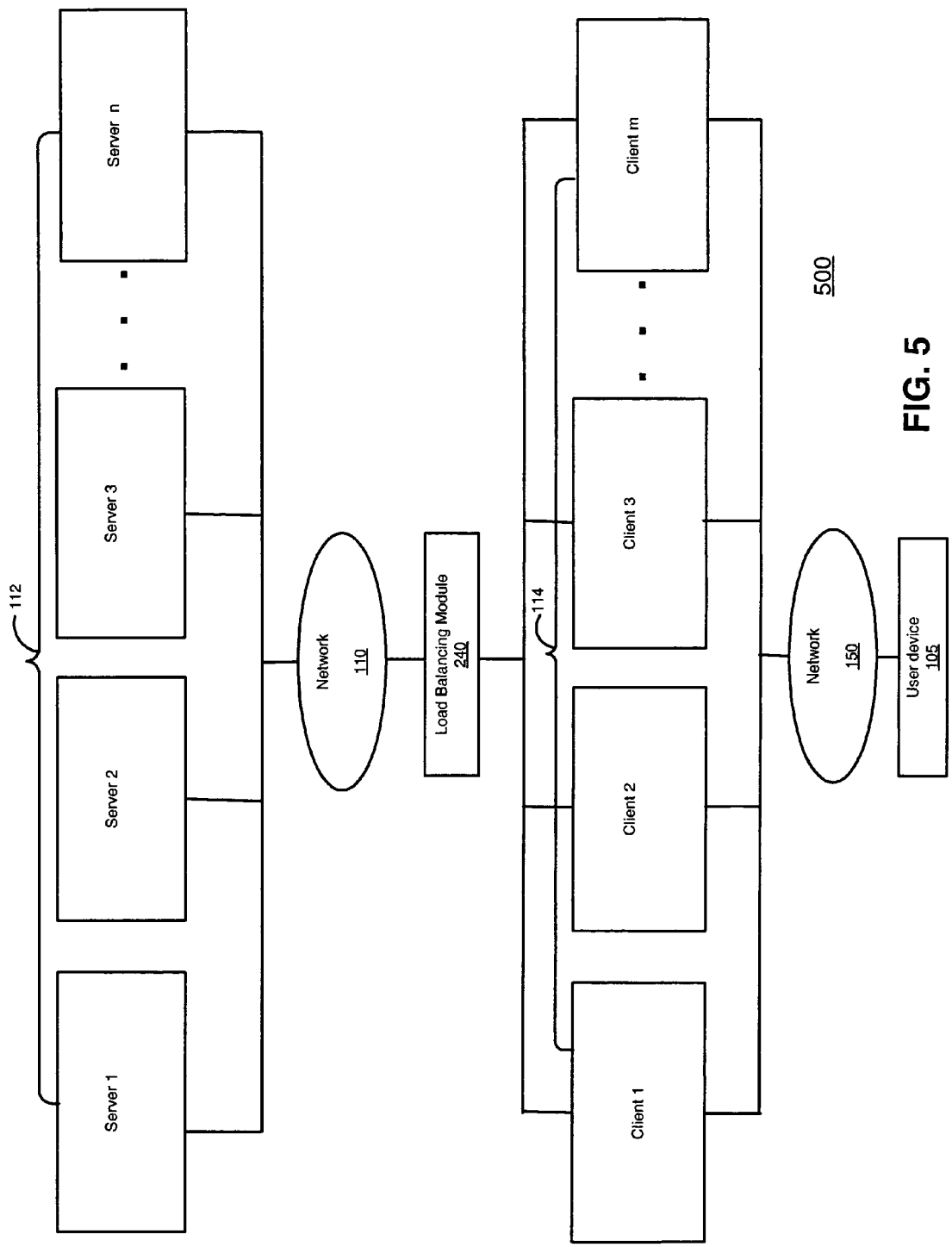
FIG. 5 is a block diagram of a system for routing requests across a network according to another embodiment of the present invention.

FIG. 5 is a block diagram of a system 500 for routing requests according to another embodiment of the present invention. In this embodiment, load balancing module 240 resides on a separate computer to which clients 114 connects using any known communication links. Load balancing module 240, in turn, is in communication with servers 112 via routing network 110. Load balancing module 240 keeps track of the status of servers 112 in the cluster of servers 112. Load balancing module 240 also maintains the identification of the last available server. Since load balancing module 240 does not reside on client 114, client 114 does not have any knowledge about the status of the servers 112.

As in the preferred embodiment, client 114 stores in memory 250 a list of potential requests that can be generated by client 114 and the type of a request as indicated by the number of times a request can be resubmitted to server 112. When load balancing module 240 receives a request, it also receives from the client 114 an indication of the type of the request. If the request is a non-idempotent one, client 114 communicates to load balancing module 240 that the request can be submitted to server 112 only once. If it is an idempotent request, client 114 communicates to load balancing module 240 the maximum number of times the request can be resubmitted. Load balancing module 240 maintains logic for routing requests to servers 112. In one embodiment, module 240 routes non-idempotent requests to the last available server 112 and idempotent requests to any server 112 or any of a subset of servers 112, as previously described in the "Methods of Operation" section of this disclosure.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A method for routing requests over a network having at least one client and a plurality of servers, the requests including idempotent and non-idempotent requests, to ensure that non-idempotent requests are processed, the method comprising:

maintaining a list of servers from the plurality of servers, wherein each server in the list of servers is marked a status of available or unavailable;

wherein a server that has successfully processed a previous request is marked as available; and
wherein a server that either does not respond to a client request or did not process a previous request is marked as unavailable;
marking a server that last indicated successful processing of a request from a client as a last available server in the list of servers;
determining a type of a subsequent request;
responsive to the subsequent request being a non-idempotent request,
routing the subsequent non-idempotent request exclusively to the server marked as the last available server; and
responsive to the subsequent request being an idempotent request, routing the subsequent request to an available server using at least one algorithm for server selection, the algorithm selected from the group consisting of: a random selection, round robin selection, and least recently used selection.

2. The method of claim 1, further comprising:
routing an idempotent request to a server that is marked as unavailable in the list of servers; and
responsive to the request not being processed, routing the request to a server that is marked as available.

3. The method of claim 1, further comprising:
updating the marking of the last available server by marking a different server that last indicated that it processed the subsequent request as the last available server.

4. The method of claim 1, further comprising:
responsive to receiving an indication from a server that it is unable to process the request due to the server failure, retrying an idempotent request at another server if the maximum number of submissions of the idempotent request has not been reached.

5. The method of claim 1, further comprising:
responsive to receiving an indication from a server that it is unable to process the request due to the server failure, not retrying the non-idempotent request.

6. The method of claim 2, wherein routing the request comprises routing the request using at least one algorithm for selecting a server, the algorithm selected from the group consisting of: a random selection, round robin selection, and least recently used selection.

7. A system for routing requests over a network having at least one client embodied in hardware, and a plurality of servers embodied in hardware, the requests including idempotent and non-idempotent requests, to ensure that non-idempotent requests are processed, the system comprising:
a web service module for generating a request to a server; and
a load balancing module for:
maintaining a list of servers from the plurality of servers, wherein each server in the list of servers is marked a status of available or unavailable;
wherein a server that has successfully processed a previous request is marked as available; and
wherein a server that either does not respond to a client request or did not process a previous request is marked as unavailable;
marking a server that last indicated successful processing of a previous request from a client as a last available server in the list of servers;
responsive to the request being non-idempotent,
routing the generated non-idempotent request exclusively to the server marked as the last available server, and
responsive to the generated request being an idempotent request, routing the generated request to an available server using at least one algorithm for server selection, the algorithm selected from the group consisting of: a random selection, round robin selection, and least recently used selection.

8. The system of claim 7, wherein the load balancing module is further adapted to:
route non-idempotent requests to a server that is marked as available from the list of servers.

9. The system of claim 7, wherein the load balancing module further maintains a value indicating the period of time after which the load balancing module should stop waiting for a response from a server.

10. A method for routing idempotent and non-idempotent requests across a network having at least one client and a plurality of servers to assure that non-idempotent requests are processed, the method comprising:
maintaining a list of servers from a plurality of servers, wherein each server in the list of servers is marked a status of available or unavailable;
wherein a server that has successfully processed a previous request is marked as available; and
wherein a server that either does not respond to a client request or did not process a previous request is marked as unavailable;
receiving a plurality of requests;
determining a type of a request;
marking a server that last indicated successful processing of a previous request from a client as a last available server in the list of servers;
responsive to the requests being non-idempotent requests, routing the non-idempotent requests exclusively to the server that is marked as the last available server; and
responsive to the requests being idempotent requests, routing the idempotent requests to an available server using at least one algorithm for server selection, the algorithm selected from the group consisting of: a random selection, round robin selection, and least recently used selection.

11. The method of claim 10, further comprising:
routing idempotent requests to a server that is marked as available on the list of servers; and
responsive to the request not being processed, routing the requests to another server that is marked as available.

12. The method of claim 10, further comprising:
routing non-idempotent requests to a server that is marked as available on the list of servers; and
responsive to the request not being processed, routing the requests to another server that is marked as available.

13. The method of claim 10, wherein the last server that processed the request provides an indication that it processed the request.

14. A system embodied in hardware for routing requests over a network to a server embodied in hardware, the requests including idempotent and non-idempotent requests, to ensure that non-idempotent requests are processed, the system comprising:
a client module for determining a type of a request; and
a load balancing module for:
maintaining a list of servers, wherein each server in the list of servers is marked as available or unavailable;
wherein a server that has successfully processed a previous request is marked as available; and
wherein a server that either does not respond to a client request or did not process a previous request is marked as unavailable;

marking a server that last indicated successful processing of a previous request from a client as a last available server in the list of servers;

receiving an indication from the client module on the type of the request;

routing a non-idempotent request exclusively to the server that is marked as the last available server; and routing an idempotent request to an available server using at least one algorithm for server selection, the algorithm selected from the group consisting of: a random selection, round robin selection, and least recently used selection.

15. A computer program product comprising a computer-readable medium containing computer program code for routing requests over a network having at least one client and a plurality of servers, the requests including idempotent and non-idempotent requests, to ensure that non-idempotent requests are processed, the computer program code adapted to:

maintain a list of servers from the plurality of servers, wherein each server in the list of servers is marked a status of available or unavailable;

wherein a server that has successfully processed a previous request is marked as available; and wherein a server that either does not respond to a client request or did not process a previous request is marked as unavailable;

mark a server that last indicated successful processing of a request from a client as a last available server in the list of servers;

determine a type of a subsequent request;

responsive to the subsequent request being a non-idempotent request, route the subsequent non-idempotent request exclusively to the server that is marked as the last available server; and responsive to the subsequent request being an idempotent request, route the subsequent request to an available server using at least one algorithm for server selection, the algorithm selected from the group consisting of: a random selection, round robin selection, and least recently used selection.

16. The computer program product of claim 15, wherein the computer program code is further adapted to:

route an idempotent request to a server that is marked as unavailable; and responsive to the request not being processed, route the request to server that is marked as available.

17. The computer program product of claim 15, wherein the computer program code is further adapted to:

route the non-idempotent request to a server that is marked as available.

18. The computer program product of claim 15, wherein the computer program code is further adapted to:

update the marking of the last available server by marking a different server that last indicated that it processed the subsequent request as the last available server.

19. The computer program product of claim 15, wherein the computer program code is further adapted to:

responsive to receiving an indication from a server that it is unable to process the request due to the server failure, retry an idempotent request at another server if the maximum number of submissions of the idempotent request has not been reached.

* * * * *